April 27, 1965  E. WILDHABER  3,180,169

GEARING

Filed Aug. 30, 1962  2 Sheets-Sheet 1

INVENTOR:

Ernest Wildhaber

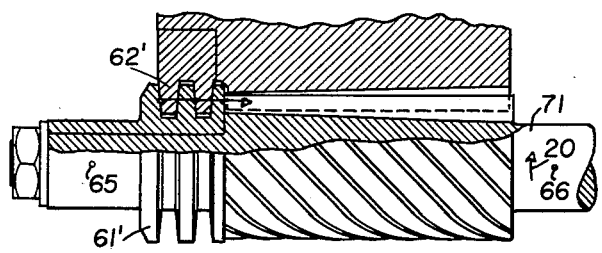
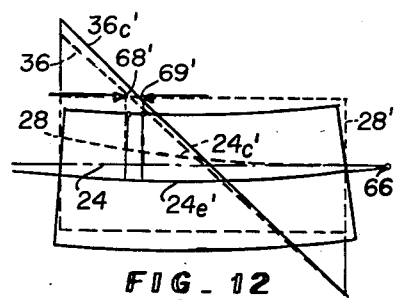
FIG.11  FIG.12
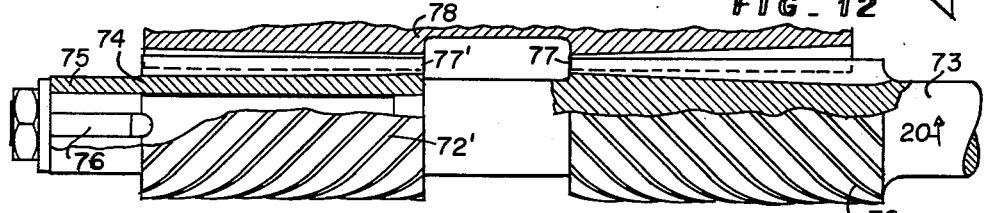
FIG.13
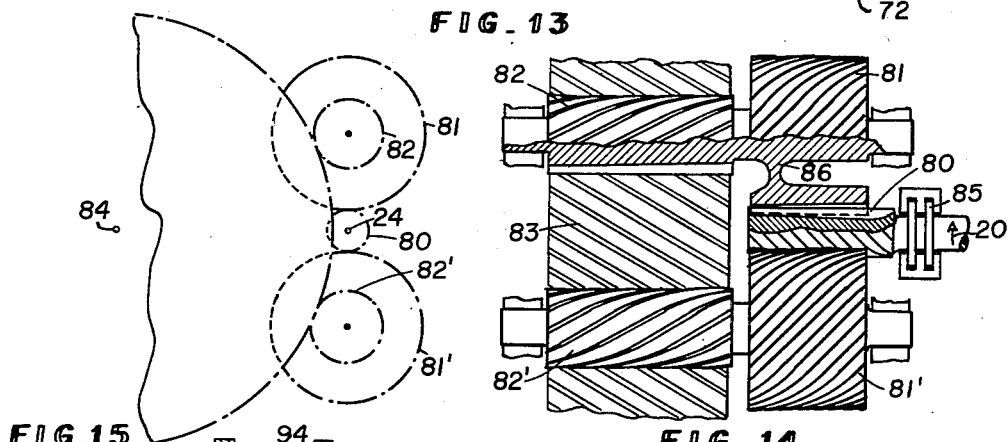
FIG.15  FIG.14
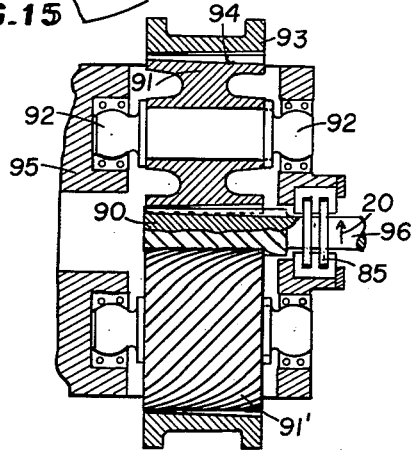
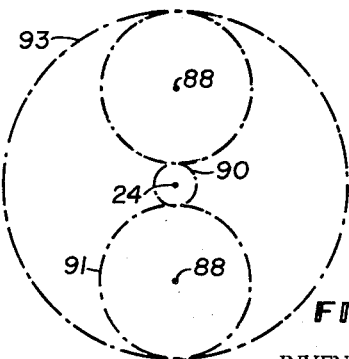
FIG.16  FIG.17
INVENTOR:
Ernest Wildhaber United States Patent Office
3,180,169
Patented Apr. 27, 1965

3,180,169
GEARING
Ernest Wildhaber, Brighton, N.Y.
(124 Summit Drive, Rochester, N.Y.)
Filed Aug. 30, 1962, Ser. No. 224,272
6 Claims. (Cl. 74—410)

The present invention relates to toothed gearing and particularly to gearing whose members run on parallel axes principally in one direction and have helical teeth of comparatively large face width. This application is a continuation-in-part of my pending application Serial No. 821,875, filed June 22, 1959, now abandoned.

A slender pinion of large face width tends to deflect under load elastically. For instance the torsional stress changes the helix angle of its teeth somewhat. A known way of counteracting this tendency is to provide a slightly different helix angle on the pinion teeth, so that at full load it matches the helix angle of the mating gear midway between the tooth ends. However the torsional deflection changes along the length of the teeth so that this does not provide a complete correction. Even if the lead of the helical pinion teeth were changed along the teeth in accordance with the changing torsional deflection, a complete correction could at best be attained only at the one load for which the correction was made. At reduced or different loads the helix angles are not matched, and the teeth bear most at the high portions, at and adjacent one end of the teeth.

In other words, the tooth bearing does not stay at the tooth middle but shifts towards one end of the teeth. It shifts increasingly with increasing deflection, that is with increasing proportion of face width to pinion diameter. For this reason proportions beyond a given limit have become tabu, to be kept away from. This deprives us of larger tooth ratios than those attainable within said rules.

One object of the present invention is to overcome this limitation so that larger tooth ratios can be attained with satisfactory gear pairs.

A further object is to provide pinions of large face width, running principally in one direction with one or more mating gears, wherein the tooth bearing remains central at all loads, light or heavy, and does not shift to one end of the teeth.

A related aim is to provide long teeth with decreased tooth bearing shift at varying loads and with longer tooth bearings, where the tooth surface stresses are generally lighter than with conventional designs. The tooth surfaces then wear less; or they can carry more load.

Another object is to provide a practical double-reduction gearing of light weight and small space requirements.

Other objects will appear in the course of the specification and in the recital of the appended claims. These aims may be attained singly or in any combination.

In the drawings:

FIG. 12 is a diagram explanatory of the effects of this different position of the thrust disks;

FIG. 13 is a part side view, part axial section, of a herringbone pinion and mating gear constructed according to the invention;

FIG. 14 is a part side view, part axial section, of a double reduction gear formed according to the invention;

FIG. 15 is a diagram corresponding to FIG. 14 and showing the pitch circles of the gears in a view along the gear axes;

FIG. 16 is a part side view, part axial section, of a gear drive constructed according to a further embodiment of the present invention;

FIG. 17 is a diagram showing the pitch circles of the gears shown in FIG. 16; and FIG. 18 is a section taken along the cylindrical pitch surface of a pinion or gear constructed according to the present invention, the section being developed or laid out in a plane.

Figure 1:
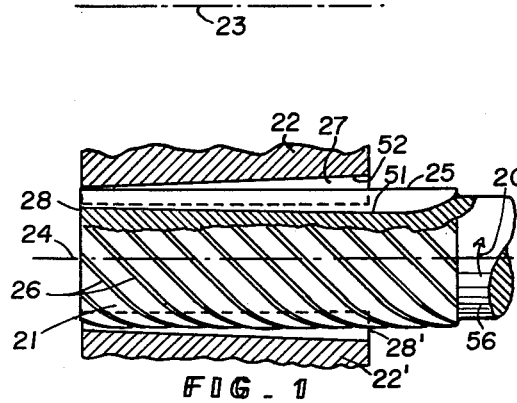
FIG. 1 is a fragmentary side view, fragmentary axial section, of a pinion and showing fragmentarily in section two gears mating therewith, illustrating one embodiment of the present invention.

In FIGS. 1 to 6 the slender and wide-faced pinion 21 (FIG. 1) meshes on diametrically opposite sides with two gears 22, 22' that are mounted to turn on two separate axes, which are parallel to the pinion axis 24, and one of which is denoted at 23 (FIG. 1). The face width of the engaged portions of the teeth of pinion 21 is equal to the width of the gears 22, 22' and larger than the outside diameter of the pinion, that is larger than the diameter of the cylindrical outside surface 25 in which the top ends of the pinion teeth lie.

The pinion, at least, is preferably hardened and finished after hardening. The pinion and gears contain mating helical teeth 26, 27, and more broadly teeth inclined to the contact line of their pitch surfaces. The latter are cylindrical surfaces when the axes are parallel, contacting along a line parallel to the axes 23, 24. This line is the axis of instantaneous relative motion lying generally within the zone of intermeshing teeth or closely adjacent thereto.

Because of its small diameter the pinion 21 torsionally deflects under load to an extent very noticeable in the tooth bearing and load distribution along the teeth. The much larger gears 22, 22' suffer only negligible torsional deflection and may be considered rigid. When they are rigidly mounted the only elastic deflection of consequence, outside of a very slight bending deflection of the teeth themselves, is the torsional deflection of the pinion 21.

Figure 2:
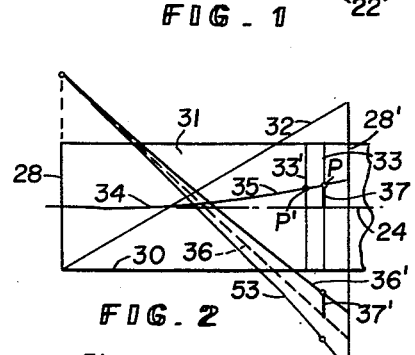
FIG. 2 is a diagrammatic side view illustrating the effects of torsional deflection under load on the pinion of FIG. 1.
Figure 3:
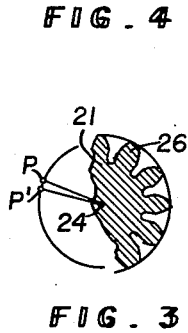
FIG. 3 is partly a fragmentary cross-section of this pinion taken adjacent the right end of its working teeth, and partly a diagram corresponding to FIG. 2.
Figure 6:
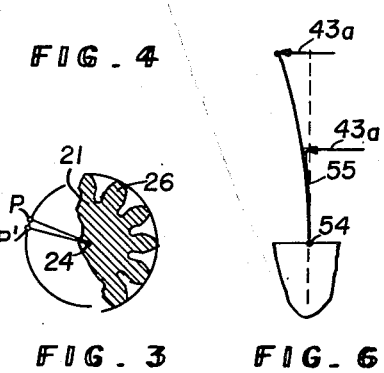
FIG. 6 is a diagram further explanatory of bending.

Let us now consider the torsional deflection of the pinion in a simplified manner with FIG. 2 for the desired case where the tooth load is uniformly distributed over the length of the teeth, with the pinion driving in the direction of arrow 20 (FIG. 1). The deflection depends on the turning moment transmitted through a considered cross-section. The turning moment is zero at the outer end 28 of the pinion and increases towards the inner end 28' of the working teeth. At the inner end the transmitted turning moment is the full pinion torque. The turning moment is plotted in FIG. 2 as an ordinate of a line 32 from a base 30 coinciding with the lower end of the outline of the cylindrical surface 31. This is the outside surface of a round bar or shaft having the same or approximately the same torque characteristic as the pinion. Its circular cross-section has the same polar moment of inertia as the cross-section of the pinion (FIG. 3).

Straight line 32 (FIG. 2) shows that the turning moment is proportional to the distance of any considered section 33 from end 28. The angle of twist between two sections 33, 33', that have a very small constant distance from each other, is proportional to the turning moment transmitted through said sections. This is the angle P–24–P' (FIG. 3) between the end surfaces of an elementary disk making up a small portion of the pinion body. This angle increases from left to right in FIG. 2 like the turning moment.

A straight line 34 of the cylindrical surface 31, coinciding with the projected pinion axis 24, is twisted by the torsional load into a curve 35 known to be a parabola in the development of the cylindrical surface 31 to a plane. The tooth helix 36 of the pinion teeth shows up as a straight line in such development. It is twisted into a curve 36' whose ordinates 37' from line 36 are equal to the ordinates 37 of curve 35 at the same distance from outer end 28. Curve 36' is tangent to helix 36 at the outer end 28. It has a changed general direction and is concavely curved on the driving side.

The torsional lag between any considered section 33 and the driving end of the pinion varies along the length of the teeth, and is largest at the outer end 28. At that end it is the aggregate of the twist angle P–24–P' of all elementary disks that make up the length of the pinion.

The invention achieves the desired uniform load distribution by introducing a further elastic deflection, which makes up for the change of the torsional lag, so that the total lag is constant along the teeth or more nearly constant.

A preferred way of achieving this end is the provision of increased tooth bending where needed. A tooth depth is provided which increases with increasing distance from the outer end 28, and is larger at end 28' than at end 28, so that the teeth bend more adjacent end 28'. The working depth of the teeth however remains constant or approximately constant.

The change in tooth depth is made independently of the sides of the teeth. The sides of the teeth may extend along helices 36 that appear as straight lines in the development shown in FIG. 18, so that the teeth have the same thickness at opposite ends 28, 28'. No specific deflection is built into the sides of the teeth, as was previously done, a deflection, which operates as desired only at a specific load. Here the torsional deflection and further deflections are neutralized by a controlled bending deflection of the teeth, so that the desired load distribution is achieved at all loads, light or heavy.

Figures 4, 5:
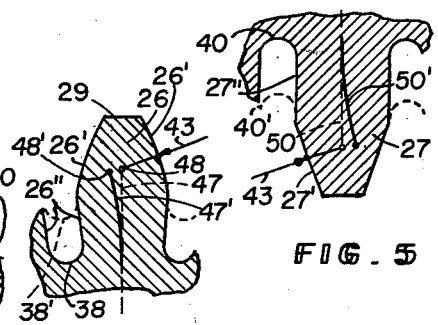
FIGS. 4 and 5 are enlarged normal sections laid through a pinion tooth and a gear tooth, respectively, adjacent the ends of largest tooth depth, also showing diagrammatically the bending action of tooth load.

FIG. 4 and FIG. 5 are enlarged normal sections of a pinion tooth 26 and of a gear tooth 27 respectively, taken near end 28'. The full lines 38, 40 denote the tooth bottoms in these sections, while the dotted lines 38', 40' indicate the tooth bottoms at the outer end 28. The side profiles of the teeth 26 are composed of a working profile 26' and of a supporting profile 26''. Similarly the side profiles of the teeth 27 are composed of a working profile 27' and of a supporting profile 27''. Each working profile (26', 27') reaches to the tooth top (29 in FIG. 4), while the supporting profile extends outwardly from the root or tooth bottom.

The working profile 26' is convexly curved. The working profile 27' of the large gear is nearly straight in the involute tooth system, but may be curved, even concavely curved with other tooth systems. The working portions of the teeth are of conventional shape and whether formed according to the involute or any other conventional system. Therefore, as already stated, the thicknesses of the teeth of both the gear and the pinion are equal at both ends of the teeth.

The supporting profiles are approximately straight, and opposite supporting profiles 26'' of a tooth space (FIG. 4) include an angle smaller than twelve degrees with each other. The supporting profiles 27'' of the gear, at least (FIG. 5), join the working profiles 27' at an angle and form a corner therewith.

Arrow 43 describes a tooth load applied at a mean point of the pinion tooth profile 26'. The line or vector of this arrow intersects the center line 47 of the tooth 26 at a point 48. The tooth load bends the tooth (not shown in bent position) and its center line, so that the center line assumes a curved shape 47' and point 48 moves to position 48' thereon.

In this bent position the profile 26' is tipped in the same direction as the center line 47' and thereby has increased its profile inclination and its pressure angle. To keep the profile inclinations matched on the pinion and gear the invention applies the increase in tooth depth to the gear as well as to the pinion.

The same tooth load 43 applied to the gear tooth 27 bends the tooth center line 50 to a curve 50' and also increases the inclination of profile 27'. Thus by suitably changing the tooth depth on both the gear and the pinion the profile inclinations are kept matched. The tooth depth required to achieve given amounts of bending can be approximately computed with known methods. An experimental determination will be described hereafter.

The root line is known to be the profile in an axial section of the surface of revolution in which the tooth bottoms lie, and particularly the inmost ends thereof. Most of the figures show straight root lines 51, 52 (FIG. 1). This is generally a satisfactory solution because straight root lines give a deflection curve 53 (FIG. 2) which is about the opposite of the deflection curve 36' obtained by torsion. The combination of the two deflections then restores or nearly restores the helix 36, and provides the desired load distribution.

Curve 53 is convex because the bending deflection attained with increasing tooth depth increases faster than the depth. This is illustrated with diagram FIG. 6, which shows the same load 43a applied at a given distance and at double this distance from the root 54 of beam 55. The deflection of the beam end is known to be proportional to the cube of the distance, and is eight times larger at the double distance.

In cases where straight tooth bottoms do not give a close enough solution I may resort either to the known measure of tooth ease-off to make up for the difference, or I may provide curved root lines.

Figure 7:
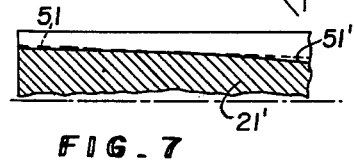
FIG. 7 is a fragmentary axial section of a pinion illustrating a slight modification of the invention.

Root line 51' of pinion 21' (FIG. 7) is convexly curved and is shown compared with a straight root line 51. Convex root lines give a bending-characteristic curve more convex than curve 53 of FIG. 2. To attain a bending-characteristic curve less convex than curve 53 a concave root line should be used.

The gearings here especially dealt with run principally in one direction. We correct the tooth side which is generally the driving side. On the opposite side of the teeth the known ease-off procedures may be applied, worked out most completely in the field of hypoid gearing.

In all embodiments mesh starts at or adjacent the outer end (28) of the pinion that turns in the direction of arrow 20. It should be noted that the torque-transmitting shaft (56, FIG. 1) is connected with the pinion teeth at the end opposite to the end where mesh starts. At this end (28) the torsional lag as compared with the driving end is largest, while the torsional strain is least there, namely zero.

Figure 10:
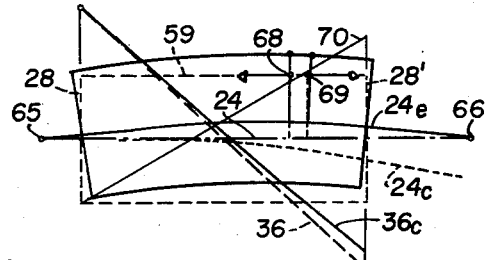
FIGS. 9 and 10 are diagrams corresponding to FIG. 8 and explanatory of bending that affects the helix of the teeth.
Figure 8:
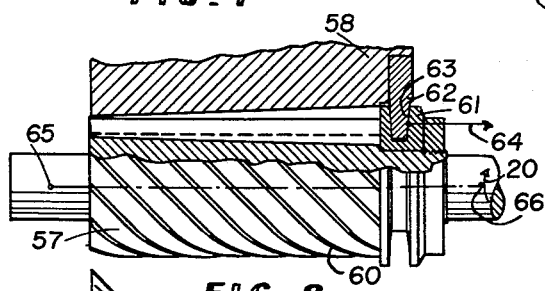
FIG. 8 is a fragmentary side view, fragmentary axial section, of a pinion and showing fragmentarily in section also a single mating gear, both pinion and gear being constructed according to the invention, and the mating members being shown provided with disks for taking up the axial thrust of the single-helical teeth.
Figure 9:
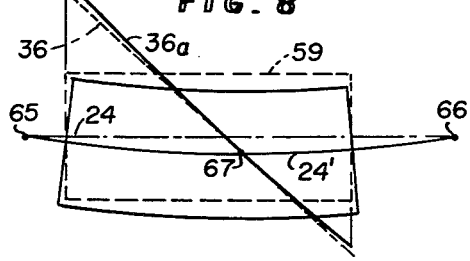

FIGS. 8 to 10 illustrate an embodiment where a drive pinion 57 meshes with a single mating gear 58. Pinion 57 contains a set of single-helical teeth 60. To take up the axial thrust circular members 61, 62 with conical contacting surfaces 63 are secured to the pinion and gear respectively. Arrow 64 describes the axial thrust load exerted on member 61 to balance the tooth thrust when driving in the direction of arrow 20. Pinion 57 is rotatably mounted adjacent both ends so that the resultant bearing pressures pass through points 65, 66.

Pinion 57 has the torsional deflection described for pinion 21, and it has additional deflections. We may consider the deflections caused by the axial thrust components separately from those caused by the load components that lie in planes perpendicular to axis 24 and then combine the two deflections and the torsional deflection.

In approximately determining the bending strains exerted on the pinion body we may substitute a cylindrical bar or rod for the pinion, as was done in considering torsion. FIG. 9 is a diagrammatic view of the pinion body taken at right angles to the plane of action of the driving side. It shows the undeflected pinion body in dotted lines 59. We consider the load components in planes perpendicular to axis 24. These loads and the resisting bearing loads acting at points 65, 66 bend the pinion body so that the pinion axis 24 assumes the bent shape 24′. Because of this bending the tooth helix 36 shown in development assumes the curved shape 36a. It is tangent to helix 36 at an intermediate point 67 where the direction of curve 24′ is parallel to the original pinion axis 24.

The axial thrust load is referred to in FIG. 10, where again the undeflected pinion body is shown in dotted lines 59. We may consider two closely adjacent cross-sections through the pinion body containing points 68, 69. The opposite thrust loads are shown by the arrows passing through said points. The thrust load shown acting at point 68 is the sum of the thrust loads exerted on the teeth between outer end 28 and the section containing point 68. This thrust load increases in proportion to the distance of the section from end 28, as shown by the ordinates of straight line 70 as measured from the dotted lower outline of the pinion body 59. As the opposite thrust loads acting at points 68, 69 are eccentric of the pinion axis 24, they exert a bending moment on the pinion body as well as axial tension. The moment is the product of the load and its distance from the pinion axis. The said loads bend the axis or central line 24. The resulting curvature is best described with dotted line 24c which is tangent to line 24 at end 28. The bending moment is zero at that end and line 24c has zero curvature there. The curvature of line 24c increases like the bending moment, in direct proportion to the distance from end 28. The pinion axis becomes a line 24e that has the same shape as line 24c and can be obtained by tilting line 24c about support point 65 so that the opposite end of said line passes through support point 66.

The effect of this bending is to alter the tooth helix 36 and to change it into a curve 36c, shown in development. The general inclination of curve 36c differs from that of helix 36 in the same direction as curve 36′ (FIG. 2) that describes the torsional deflection. This should be allowed for in the computation of the root lines to be provided on the pinion and gear.

Figure 11:
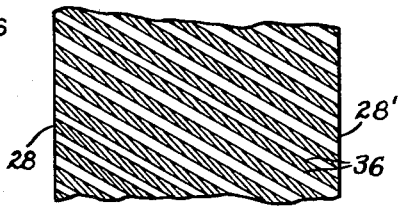
FIG. 11 is a part side view, part axial section, similar to FIG. 8, but showing thrust disks placed on the opposite ends of the pinion and gear.

FIGS. 11 and 12 illustrate an embodiment similar to that of FIGS. 8 to 10, but with the thrust disks or circular members 61′, 62′, disposed on the side opposite the torque-transmitting shaft 71. They are placed on the side where the mesh starts, with the pinion turning in the direction of arrow 20. The axial thrust then bends the pinion in a different way, illustrated by FIG. 12.

Again two closely adjacent cross-sections are considered that pass through points 68′, 69′. The thrust loads acting at these points are indicated by arrows. They act in opposite directions as compared with FIG. 10 and cause compression and an opposite bending moment. The resultant curvature of axis or central line 24 is best described by dotted line 24c′ that is tangent to axis 24 at end 28′. At this end it has no curvature. The curvature of line 24c′ increases with increasing distance from end 28′. The pinion axis assumes a shape 24e′ like line 24c′, but tilted to pass through the points of bearing support.

The tooth helix 36 is here changed into a curve 36c′ shown in development. Its inclination to the direction of axis 24 is larger than that of helix 36. It is oppositely inclined to helix 36 as compared with curve 36′ of FIG. 2 that relates to torsional deflection, and provides some compensation therefor. The depth change required lengthwise of the teeth is decreased. In some instances a change in tooth depth can be dispensed with.

A related embodiment is attained when the axial thrust of the pinion is taken up in more conventional way on the pinion shaft at the end (28) opposite to the drive shaft (71).

An application to herringbone gears is shown in FIG. 13. Here the pinion carries two sets of helical teeth 72, 72′ of opposite hand. The teeth 72 are formed integral with a drive shaft 73, while the teeth 72′ are provided on a sleeve member 74 that is driven at its outer end 75 by an extension of shaft 73. The drive connection is by such conventional means as for instance keys 76; and sleeve member 74 is otherwise free to turn on said extension but is axially fixed thereto.

The teeth 72, 72′ are in mesh with the teeth of a mating gear 78. With the pinion rotating in the direction of arrow 20 the mesh starts at the adjacent portions 77, 77′ of the teeth, near the middle of the herringbone pinion. It should be noted that both sets of teeth 72, 72′ are driven from the ends opposite to the ends where the mesh starts. The drive is from the outer ends on both sets of teeth. The tooth depth increases from the central portion to the outside.

An application to double-reduction gearing will now be described with reference to FIGS. 14 and 15. Helical pinion 80 is similar to pinion 21 of FIG. 1. It meshes with a pair of helical gears 81, 81′ rotatably mounted on axes parallel to the pinion axis. Helical pinions 82, 82′ are coaxial with the respective gears 81, 81′ and rigid therewith, either formed integral therewith or rigidly connected thereto. The pinions 82, 82′ mesh with a common gear 83 shown fragmentarily. It is rotatable on an axis 84 parallel to the axes of gears 81, 81′ and pinion 80, and eccentric of the axis 24 of the pinion 80. Drive is assumed to be in the direction of arrow 20. All the teeth have a depth increasing from the end of starting mesh towards the end where drive is applied, to compensate for the torsional deflection of the pinions. A thrust bearing 85 is diagrammatically indicated, for taking up the pinion axial thrust without holding the pinion shaft radially.

The pinion 80 is rotatably mounted by the gears 81, 81′ themselves and is left to find its own exact radial position, so that the opposite driving loads are balanced and the same load is transmitted through each of the gears 81, 81′. Either a relatively long drive shaft is used on pinion 80, while running it at a speed materially different from the critical speed, or a so-called flexible gear coupling is used in the drive to give the pinion enough freedom to adjust itself to the gears 81, 81′.

Some bending deflection will occur in the rotors comprising each gear 81, 81′ and its coaxial pinion. I have found that it can be largely compensated by a design of the gear bodies as indicated at 86 in FIG. 14.

The lead of the helical teeth of the pinions 82, 82′ is preferably made equal to the lead of the teeth of the gears 81, 81′ and the same hand is used. In this way the axial thrust of a gear (81) balances the axial thrust of its coaxial pinion (82).

In a ship drive with a pair of turbines, the two turbines may drive respectively two pinions (80) placed on diametrically opposite sides of a common driven gear (83). The latter is then driven by four pinions (82) and a compact construction is attained.

FIGS. 16 and 17 illustrate a further embodiment. The helical pinion 90 turns in the direction of arrow 20 most of the time and meshes on opposite sides with a pair of helical gears 91, 91' mounted to turn on parallel axes 88. Split spherical bearings are diagrammatically shown in the drawing, but other bearing types may be used as well. The gears 91, 91' mesh with a common internal gear 93 that is coaxial with pinion 90. The internal gear 93 may be kept stationary; and the drive is then imparted to the carrier 95 on which the gears 91, 91' are mounted. The carrier is rotatably mounted by conventional means not shown. Or the internal gear 93 may be mounted to turn while the carrier 95 is stationary.

Pinion 90 and gears 91, 91' are provided with teeth whose depth changes in the above described manner. The tooth depth is smallest at the end opposite to the drive shaft 96 and increases towards said drive shaft. A thrust bearing 85 takes up the axial thrust of the pinion. As in the embodiment described with FIG. 14 the pinion 90 is left to find its own exact position between the gears 91, 91' and transmits the same load to both of them.

The gears 91, 91' mesh with the pinion 90 and the internal gear 93 with opposite sides of their teeth. The root line 94 of the gears 91, 91' is determined for the mesh with pinion 90, and does not necessarily fit the mesh with the internal gear. Tooth ease-off or crowning of known character is used to maintain this tooth bearing within the ends of the teeth. Crowning may be applied to the gears 91, 91' on the tooth side that meshes with the internal gear, or to the internal gear 93, or to both.

While ease-off or crowning restricts the tooth bearing area, this restriction is here applied to the mesh between gears 91, 91' and internal gear 93. This mesh is much less critical than the mesh of said gears with the pinion 90, where the contacting tooth surfaces are much more curved relatively to each other.

It should be noted that in the described embodiments the depth change of the teeth is largely or wholly due to the depth change of the supporting tooth profiles. The proportion of the working depth of the teeth to their full depth decreases as the depth increases.

The supporting profiles are preferably applied in an operation separate from the cutting of the working profiles. One way of producing the supporting profiles is by hobbing. The hob used is sometimes called a single-position hob. Its generation is arrested at a finish-cutting edge that alone applies the final shape. This edge is either at one end of the hob thread or at the intersection of two thread surfaces of different lead. The shape produced by such hobs depends on the axial hob position which has to be accurately maintained. The hob is fed axially as well as radially of the workpiece, the rate of axial feed being constant and the rate of radial feed being constant to produce straight root lines, and varying to produce curved root lines.

The supporting profiles can also be produced with reciprocating tools, as by a tool that on its working stroke moves uniformly along the desired root line while the workpiece is rotated continuously and uniformly on its axis. They can also be produced in other ways. Since the supporting profiles and tooth space bottoms are produced in a separate operation from the working profiles, the depth of the teeth changes independently of the tooth thickness.

In one procedure the root lines of the teeth are computed and cut on one set of gears with slightly less taper than computed. Then a test of the tooth bearing is made after marking compound or paint has been applied to the gear teeth and pinion teeth. The pinion is then rotated slowly in mesh with the gear or gears. The load is gradually increased to full load during slightly less than one turn of the gear or gears and motion is stopped. The tooth marking will then show how the tooth bearing is distributed, and the root lines are then recut with the corrections derived from the tooth marking. On double reduction gears a similar test is made with the second stage, the driven gear making slightly less than one turn.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. Gearing for running principally in one direction, comprising
   (a) a pinion having a set of identical teeth whose face width is larger than the pinion outside diameter,
   (b) a gear mating therewith,
   (c) said pinion and gear having teeth inclined longitudinally to the contact line of their pitch surfaces so that mesh starts adjacent one end of the mating teeth and moves progressively along the length of the teeth,
   (d) a torque-transmitting driving shaft connected with said pinion at the end that is opposite to said one end when the gearing runs in said one direction, so that the varying elastic torsional lag of the pinion under load as compared with the driving end is largest at the start of the mesh, said varying lag distorting the pitch lines of the teeth increasingly with increasing load, and
   (e) means effective increasingly with increasing load for approximately restoring said pitch lines at all loads,
   (f) said means comprising teeth having a tooth depth that changes along the length of the teeth and is largest where the torsional lag is smallest, the change in tooth depth being sufficient to counteract the torsional deflection by a bending deflection of the teeth, whereby said teeth have a well-spread tooth contact at all loads, large and small.

2. A gear having
   (a) a cylindrical pitch surface and having
   (b) teeth whose depth changes along their length and is larger at one end than at the other end of the teeth,
   (c) the tooth thickness of said gear on its pitch surface being equal at both ends of its teeth,
   (d) the side profiles of said teeth being composed of a working profile reaching to the tooth top and of a supporting profile extending outwardly from the tooth root,
   (e) said working profile having an approximately constant depth while the depth of said supporting profile increases with increasing tooth depth.

3. A gear according to claim 2, wherein
   (a) said supporting profile is approximately straight in a section normal to a tooth space and includes an angle smaller than twelve degrees with the opposite supporting profile of said tooth space, and wherein
   (b) the gear has an approximately cylindrical outside surface.

4. A gear according to claim 2 wherein said working profile and supporting profile join at an angle.

5. Gearing for running principally in one direction, comprising
   (a) a pinion and a mating gear having teeth inclined longitudinally to the contact line of their pitch surfaces so that the mesh starts adjacent one end of the mating teeth and moves progressively along the teeth,
   (b) a drive shaft connected with said pinion at the end that is opposite to said one end when the gearing runs in said one direction, so that the elastic torsional lag of the pinion under load as compared with the driving end is largest at the start of the mesh, (c) the teeth of both the gear and the pinion having a depth changing lengthwise of the teeth independently of the thickness of the teeth.

6. Gearing according to claim 5, wherein
(a) the tooth depth increases from said one end toward said drive shaft, and wherein (b) the tooth thickness is equal at both ends of the teeth.

References Cited by the Examiner
UNITED STATES PATENTS
1,351,401  8/20  Parsons et al. _____ 74—410

DON A. WAITE, *Primary Examiner.*